No. 637,842. Patented Nov. 28, 1899.
E. D. WOODS.
BEARING.
(Application filed Oct. 29, 1898.)
(No Model.)
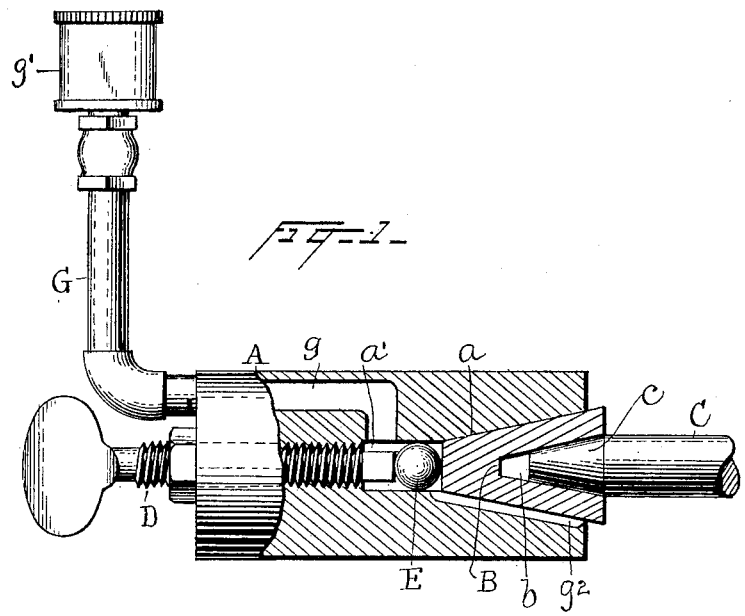
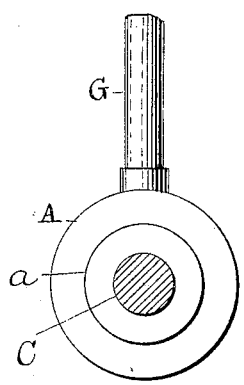
WITNESSES:
Norris A. Clark.
Jas. C. Howell.
INVENTOR
Edward Dinsmore Woods
BY
Witter & Kenyon
ATTORNEYS

UNITED STATES PATENT OFFICE.

EDWARD DINSMOORE WOODS, OF GRANVILLE, NEW YORK, ASSIGNOR TO THE WOODS SPECIALTY COMPANY, OF NEW YORK.

BEARING.

SPECIFICATION forming part of Letters Patent No. 637,842, dated November 28, 1899.

Application filed October 29, 1898. Serial No. 694,881. (No model.)

*To all whom it may concern:*

Be it known that I, EDWARD DINSMOORE WOODS, a citizen of the United States, and a resident of Granville, New York, have invented a new and useful Improvement in Bearings, of which the following is a specification.

My invention relates to bearings.

It has for its object to provide an easy-running adjustable bearing especially adapted to support shafts rotated at a high rate of speed.

It consists of the novel device herein shown and described.

In the drawings in which I have shown the preferred form of my device corresponding letters in the different figures refer to corresponding parts.

Figure 1 is a side view, partly in elevation and partly in section, of my improved bearing; and Fig. 2 is an end view of the same with the oil-cup omitted.

In the drawings I have shown my improved bearing supporting one end of a shaft C, the shaft being broken off, as shown. The other end of the shaft will be supported in another bearing of the same kind. In my improved bearing, A is a cup having a conical interior $a$ and an inner cylindrical recess $a'$.

C is a part of the shaft of any object that it is desired to rotate. I preferably use between the cup A and the shaft a cone B, fitting the interior $a$ and having a recess $b$, preferably conical, to receive the conical end $c$ of the shaft.

D is a pin, preferably screw-threaded, with a thumb-piece entering cup A from one end, as shown, and having its end projecting into the cylindrical recess $a'$. In this recess, between the end of pin D and the end $c$ of the shaft C, or, if cone B be used, between its end and the end of screw D, I place a steel ball E.

Oil is supplied to the interior of the cup A through channel $g$ and pipe G from any suitable source of supply, as from oil-cup $g'$, and an oil-groove is preferably cut in the face of the conical interior $a$.

By turning the pin one way or the other the position of cone B or the conical end $c$ of the shaft is adjusted relatively to the conical interior $a$ of the cup, so as to compensate for the wear of the parts and to make the bearing an easy-running one at all times.

By using the cone B between the shaft and the rest of the bearing wear upon the end of the shaft is largely, if not entirely, avoided, thus in many cases effecting a great saving and often prolonging the life of the shaft and the machine or article which it carries.

My device is applicable in any case in which an adjustable easy-running bearing is desired, and is especially valuable where a high speed of rotation is maintained. It is simple in construction and affords a very easy and free-running bearing and one easily adjustable.

In the form shown in the drawings pin D is simply turned, the screw-threads holding the pin in place. Any other suitable means for fastening the pin in place may, however, be used instead of screw-threading the pin.

What I claim as new, and desire to secure by Letters Patent, is—

1. A bearing for a rotating shaft consisting of a cup having a conical interior adapted to receive the shaft, a pin to adjust the end of the shaft in the cup, and a ball interposed between the adjusting-screw and the shaft, substantially as set forth.

2. A bearing for a rotating shaft consisting of a cup having a conical interior, a cone fitting the cup and recessed to receive the shaft, a pin to adjust the cone in the cup, and a ball interposed between the adjusting-screw and the cone, substantially as set forth.

3. A bearing for a rotating shaft consisting of a cup having a conical interior, a cone fitting the cup and provided with a conical recess to fit the conical end of a shaft, a pin to adjust the cone in the cup and a ball interposed between the adjusting-screw and the cone, substantially as set forth.

4. A bearing for a rotating shaft consisting of a cup having a conical interior and an inner cylindrical recess, a cone fitting the cup and provided with a conical recess to fit the conical end of a shaft, a pin projecting into the inner cylindrical recess of the cup to adjust the cone in the cup, and a ball interposed inside near the cylindrical recess between the adjusting-screw and the cone, substantially as set forth.

In testimony whereof I have signed my name to this specification in the presence of two subscribing witnesses.

EDWARD DINSMOORE WOODS.

Witnesses:
EDWIN SEGER,
SIDNEY MANN.